(12) United States Patent
Jeong

(10) Patent No.: US 8,703,353 B2
(45) Date of Patent: Apr. 22, 2014

(54) SEPARATOR FOR FUEL CELL

(75) Inventor: Hee Seok Jeong, Seoul (KR)

(73) Assignee: Hyundai Motor Company, Seoul (KR)

( * ) Notice: Subject to any disclaimer, the term of this patent is extended or adjusted under 35 U.S.C. 154(b) by 130 days.

(21) Appl. No.: 13/312,485

(22) Filed: Dec. 6, 2011

(65) Prior Publication Data

US 2013/0065156 A1  Mar. 14, 2013

(30) Foreign Application Priority Data

Sep. 9, 2011 (KR) .................. 10-2011-0091520

(51) Int. Cl.
*H01M 8/10* (2006.01)
*H01M 8/04* (2006.01)

(52) U.S. Cl.
USPC .......................................... 429/482; 429/514

(58) Field of Classification Search
None
See application file for complete search history.

(56) References Cited

U.S. PATENT DOCUMENTS

| 2009/0162715 A1* | 6/2009 | Burdzy | 429/30 |
| 2011/0244369 A1* | 10/2011 | Kondo | 429/513 |

FOREIGN PATENT DOCUMENTS

| JP | 2002184422 A | 6/2002 | |
| JP | 2007087768 | 4/2007 | |
| JP | 2008287955 A | 11/2008 | |
| JP | 2009021022 A | 1/2009 | |
| JP | 2009064688 A | 3/2009 | |
| KR | 10-0424195 | 5/2003 | |
| KR | 10-0434778 | 7/2003 | |
| KR | 10-2004-0031697 | 4/2004 | |
| KR | 10-1019922 | 3/2005 | |
| KR | 10-2006-0047536 | 5/2006 | |
| WO | WO 2010/119584 | * 10/2010 | ............ H01M 8/02 |

* cited by examiner

*Primary Examiner* — Yoshitoshi Takeuchi

(74) *Attorney, Agent, or Firm* — Edwards Wildman Palmer LLP; Peter F. Corless

(57) ABSTRACT

A separator for a fuel cell includes a flow field plate and a main body plate. The flow field plate has a porous plate structure and is bonded to an outer surface of a gas diffusion layer to form a reaction gas flow field. The main body plate is bonded to an outer surface of the flow field plate to seal the reaction gas flow field. The flow field plate has protrusions that protrude from both surfaces of the flow field plate in a repetitive pattern, forming an uneven structure. The flow filed plate has a land portion bonded to the gas diffusion layer at a sharp tip of a protrusion thereof protruding from one surface of the flow field plate and a bonding portion bonded to the main body plate at an opposite sharp tip of a protrusion thereof protruding from the other surface of the flow field plate.

13 Claims, 4 Drawing Sheets

SEPARATOR FOR FUEL CELL

CROSS-REFERENCE TO RELATED APPLICATION

This application claims under 35 U.S.C. §119(a) the benefit of Korean Patent Application No. 10-2011-0091520 filed Sep. 9, 2011, the entire contents of which are incorporated herein by reference.

BACKGROUND (a) Technical Field

The present invention relates to a separator for a fuel cell. More particularly, it relates to a separator for a fuel cell which can minimize gas diffusion and concentration differences between areas in a gas diffusion layer and achieve uniform electrochemical reaction and electricity generation over the whole reaction area, by improving the structure of a flow field in which reactant gases flow.

(b) Background Art

Polymer Electrolyte Membrane Fuel Cells (PEMFCs) are employed to generate electricity by electrochemically reacting hydrogen and oxygen (or air) as reactant gases.

Since PEMFCs have high efficiency, high current density and power density, short startup time, and quick response characteristics with respect to load variation compared to other types of fuel cells, PEMFCs may be applied to various fields such as power sources for pollution-free vehicles and power sources for independent power generation, transport, and military.

Generally, fuel cells are used in a stacked form in which unit cells are stacked to satisfy a necessary power level. Since fuel cells mounted in vehicles also need high power, hundreds of unit cells are stacked to meet requirements.

A Membrane-Electrode Assembly (MEA) is disposed at the innermost portion of the unit cell structure of a fuel cell stack. The MEA includes a solid polymer electrolyte membrane and catalyst electrodes, i.e., anode and cathode, that are configured by coating catalyst on both surfaces of the electrolyte membrane.

A gas diffusion layer (hereinafter, referred to as GDL), a gasket, and the like are disposed outside the MEA, i.e., outside the anode and the cathode. Also, a separator is disposed outside the GDL to provide a flow field for supplying reactant gases and exhausting water generated from a reaction.

In such a structure, an oxidation reaction of hydrogen is performed in the anode of the fuel cell to generate protons and electrons. Protons and electrons that are generated are moved to cathode through the electrolyte membrane and the separator, respectively.

Thus, water is generated by an electrochemical reaction in which protons and electrons transferred from the anode and oxygen from air are involved, and heat is generated together with water during the electrochemical reaction. Also, electrical energy is generated from the flow of electrons.

On the other hand, the separator is a part that separates unit cells in the fuel cell stack and serves as a current passage between cells. The flow field formed in the separator serves as a supply passage for delivering reaction gases to GDL and an exhaust passage for exhausting water from GDL.

Examples of separators include graphite separators formed of graphite materials and metallic separators formed of metallic materials such as stainless steel. Recently, many studies are being conducted to replace graphite separators with metallic separators in consideration of workability and mass-production.

FIG. 1 is a cross-sectional view illustrating a typical metallic separator, in which a MEA 11, a GDL 12, and a separator 20 are boned to each other.

As shown in the drawing, the separator 20 includes a land (contacting) portion directly bonded to the GDL 12 and a channel portion that serves as a supply passage (passage of air and hydrogen) of reaction gases and an exhaust passage of water between land portions.

The channel portions of the typical separator 20 are disposed substantially parallel to each other over the whole of a reaction area of a fuel cell, or are disposed to form an inclined flow field. There are advantages and disadvantages in the characteristics such as cell performance, pressure, and water exhaust according to methods for designing the flow field, but methods for supplying reaction gases by processing a flow field of a rectangular sectional structure and other structures similar thereto at a portion corresponding to the reaction area are being commonly employed.

In such a separator, the land portion and the channel portion are disposed in a longitudinal direction, and thus an area in which the land portion is bonded to GDL and a flow field (supply passage of reaction gases and exhaust passage of water) area in which the channel portion is formed both have a longitudinal structure. Also, the land portion and the channel portion are distinctly separated from each other.

In this case, since the inner surface of the channel portion is smooth, the flow of reaction gases in the channel portion shows the characteristics of a laminar flow. Reaction gases are delivered and diffused to GDL by a pressure difference or a concentration difference without any force caused by flow while reaction gases flow along a long flow field.

Also, the diffusion amount of gases delivered to GDL due to a flow difference between the land portion and the channel portion varies according to a GLD area to which the land portion and the channel portion are bonded, and water exhaust performance from GDL also shows a difference between the land portion and the channel portion.

As well known in a fuel cell, reaction gases supplied through a flow field of a separator had better be uniformly diffused over the whole area of GDL, and water generated by a reaction had better be promptly exhausted to the outside because water inhibits a chemical reaction from occurring in an electrolyte membrane of a fuel cell.

However, in the case of a typical separator, since the land portion having a large area is bonded to the GDL 12, a diffusion amount of gases varies between a wide GDL area to which the land portion is bonded and a GLD area contacting the flow field of the channel portion.

Referring to FIG. 1, reaction gases (air and hydrogen) are diffused from the flow field of the channel portion to the GDL 12. In such a structure, the diffusion amount of gases inevitably varies between the areas of the GDL 12 that contact the land portion and the channel portion, respectively.

This non-uniformity causes a concentration difference between the area that the channel portion contacts and the area that the land portion contacts among the whole area of the MEA 11 where the electrochemical reaction occurs.

As a result, there occurs a difference of an electrochemical reaction in the whole area of MEA, making it difficult to expect uniform electricity generation over the whole reaction area and reducing the overall performance of a fuel cell.

Also, since a typical separator mainly relies only on diffusion in terms of delivery of reaction gases to GDL, mass transfer from the separator to a catalyst layer is difficult to achieve, which lowers the limiting current density of a fuel cell and thus causes reduction of the overall performance.

Furthermore, since the land portion is bonded at a large area to GDL to which water is exhausted, water that is a by-product of an electrochemical reaction is difficult to exhaust.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a separator for a fuel cell, which can minimize gas diffusion and concentration differences between areas in a gas diffusion layer and achieve uniform electrochemical reaction and electricity generation over the whole reaction area, by improving the structure of a flow field in which reactant gases flow.

In one aspect, the present invention provides a separator for a fuel cell, including: a flow field plate having a porous plate structure and bonded to an outer surface of a gas diffusion layer to form a reaction gas flow field; and a main body plate bonded to an outer surface of the flow field plate to seal the reaction gas flow field, wherein the flow field plate has protrusions that protrude from both surface of the flow field plate in a repetitive pattern while forming an uneven structure, and the flow filed plate has a land portion bonded to the gas diffusion layer at a sharp tip of a protrusion thereof protruding from one surface of the flow field plate and a bonding portion bonded to the main body plate at an opposite sharp tip of a protrusion thereof protruding from the other surface of the flow field plate In an exemplary embodiment, the land portions of the protrusion may be spaced from each other on a surface of the flow field plate in front to rear and right to left directions.

In another exemplary embodiment, the protrusion may have an aperture in an inclined side surface thereof to allow reaction gases to pass therethrough, respectively.

In still another exemplary embodiment, the apertures may be arranged at predetermined intervals on the flow field plate in front to rear and right to left directions.

In yet another exemplary embodiment, the land portions of the protrusions may be bonded to the gas diffusion layer with a linear contact condition.

In still yet another exemplary embodiment, other portions of the protrusion that protrude from the one surface of the flow field plate except the land portion may be spaced from the gas diffusion layer.

In a further exemplary embodiment, a side end of the protrusion may be spaced from the gas diffusion layer such that reaction gases pass through a gap between the side end of the protrusion and the gas diffusion layer in a lateral direction.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
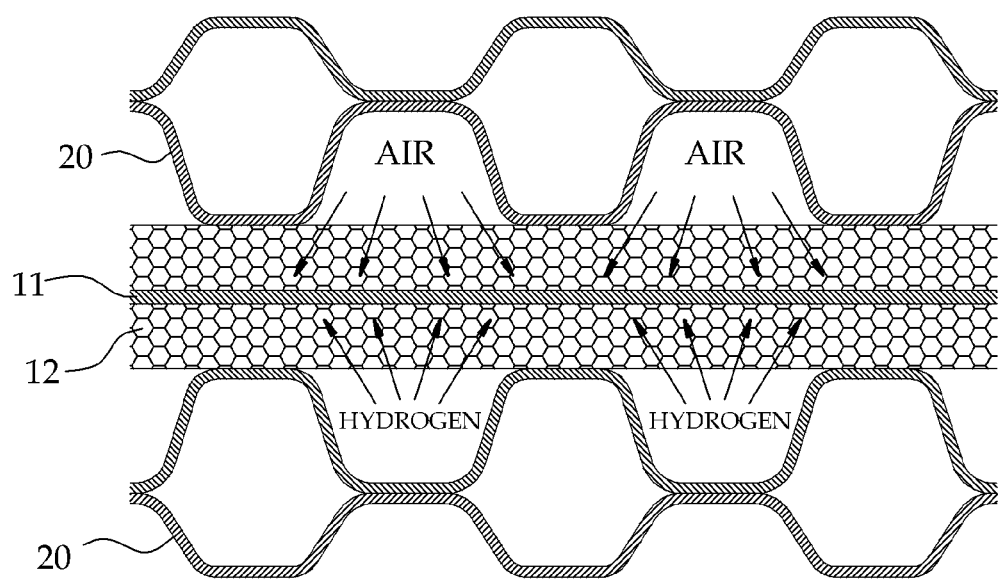
FIG. 1 is a cross-sectional view illustrating a cell to which a typical metallic separator is applied.

Reference numerals set forth in the Drawings includes reference to the following elements as further discussed below:

11: Membrane-Electrode Assembly (MEA);
12: gas diffusion layer (GDL);
20: separator;
21: flow field plate;
21a: protrusion;
21b: land portion;
21c: bonding portion;
21d: aperture; and
22: main body plate.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

The present invention relates to a separator for a fuel cell, which can minimize gas diffusion and concentration differences between areas in a gas diffusion layer (GDL) and achieve uniform electrochemical reaction and electricity generation over the whole reaction area, by improving the structure of a flow field in which reactant gases flow.

Figure 2:
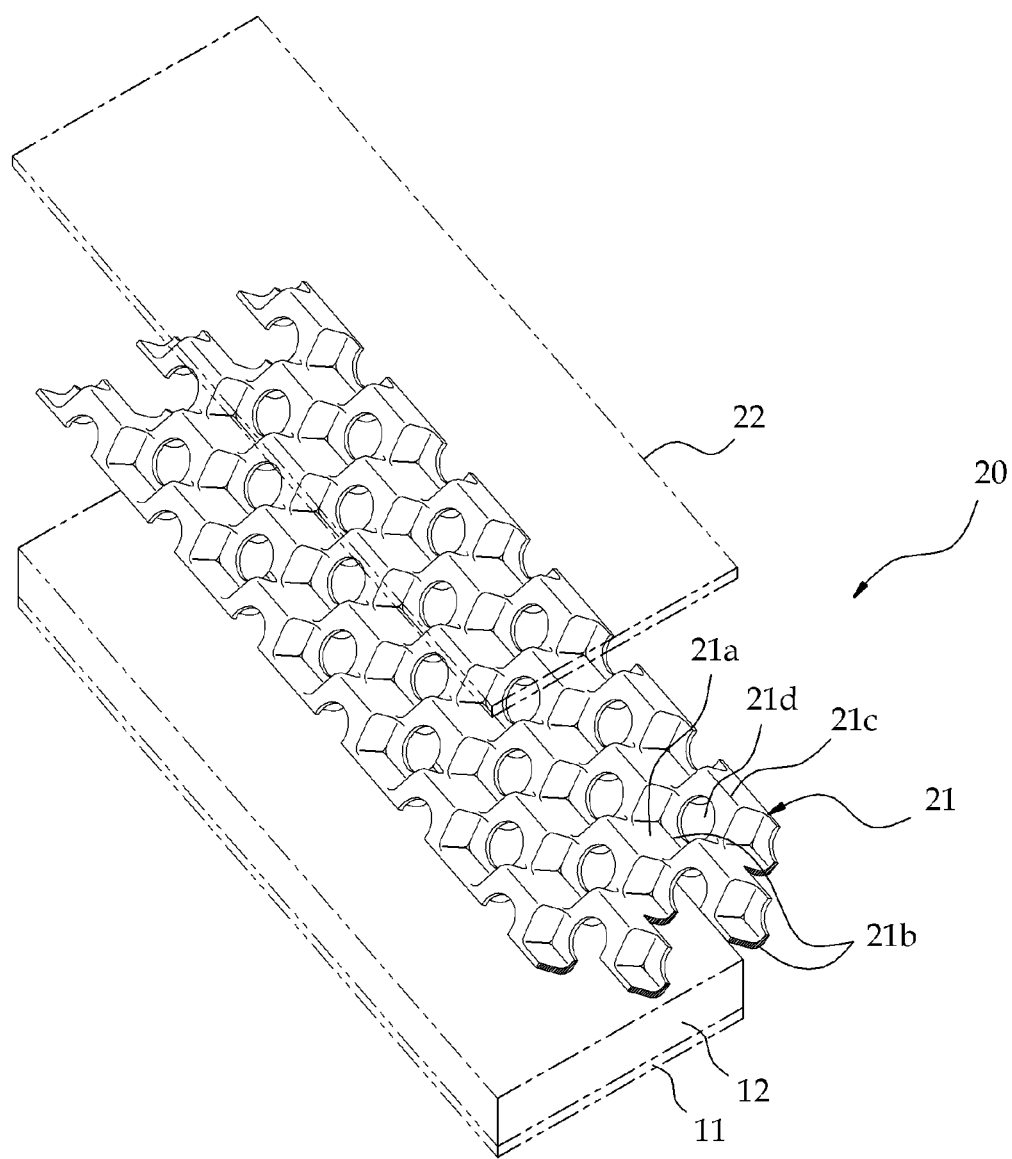
FIG. 2 is a perspective view illustrating a structure of a separator according to an embodiment of the present invention.

FIG. 2 is a perspective view illustrating a structure of a separator according to an embodiment of the present invention. A Membrane-Electrode Assembly (MEA) 11 and a separator 20 may be bonded to a gas diffusion layer (GDL) 12. The GDL 12 and the separator 20 may be actually bonded to both sides of the MEA 11, but only the GDL 12 and the separator 20 at one side of the MEA 11 are shown in the drawing.

Also, although stack and cell structures are fabricated in a state where all components of the MEA 11, the GDL 12, and the separator 20 are bonded to each other, in FIG. 2, components other than the MEA 11 and the GDL 12 are shown as exploded.

Figure 3:
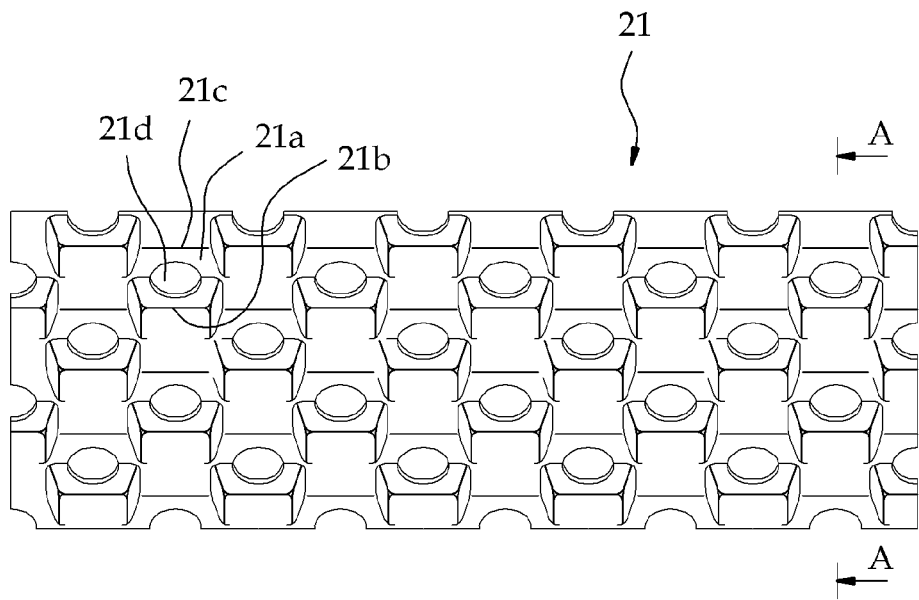
FIG. 3 is a plan view of a flow field plate in a separator according to an embodiment of the present invention.
Figure 4:
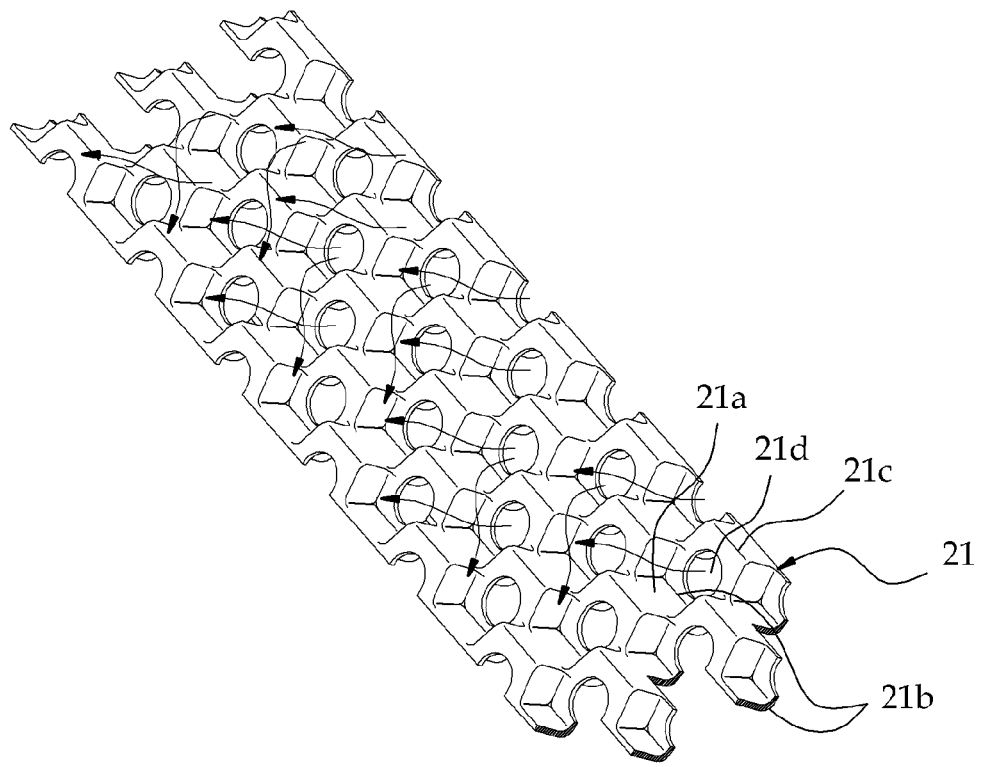
FIG. 4 is a perspective view illustrating a flow path of reaction gases by a flow field plate in a separator according to an embodiment of the present invention.
Figure 5:
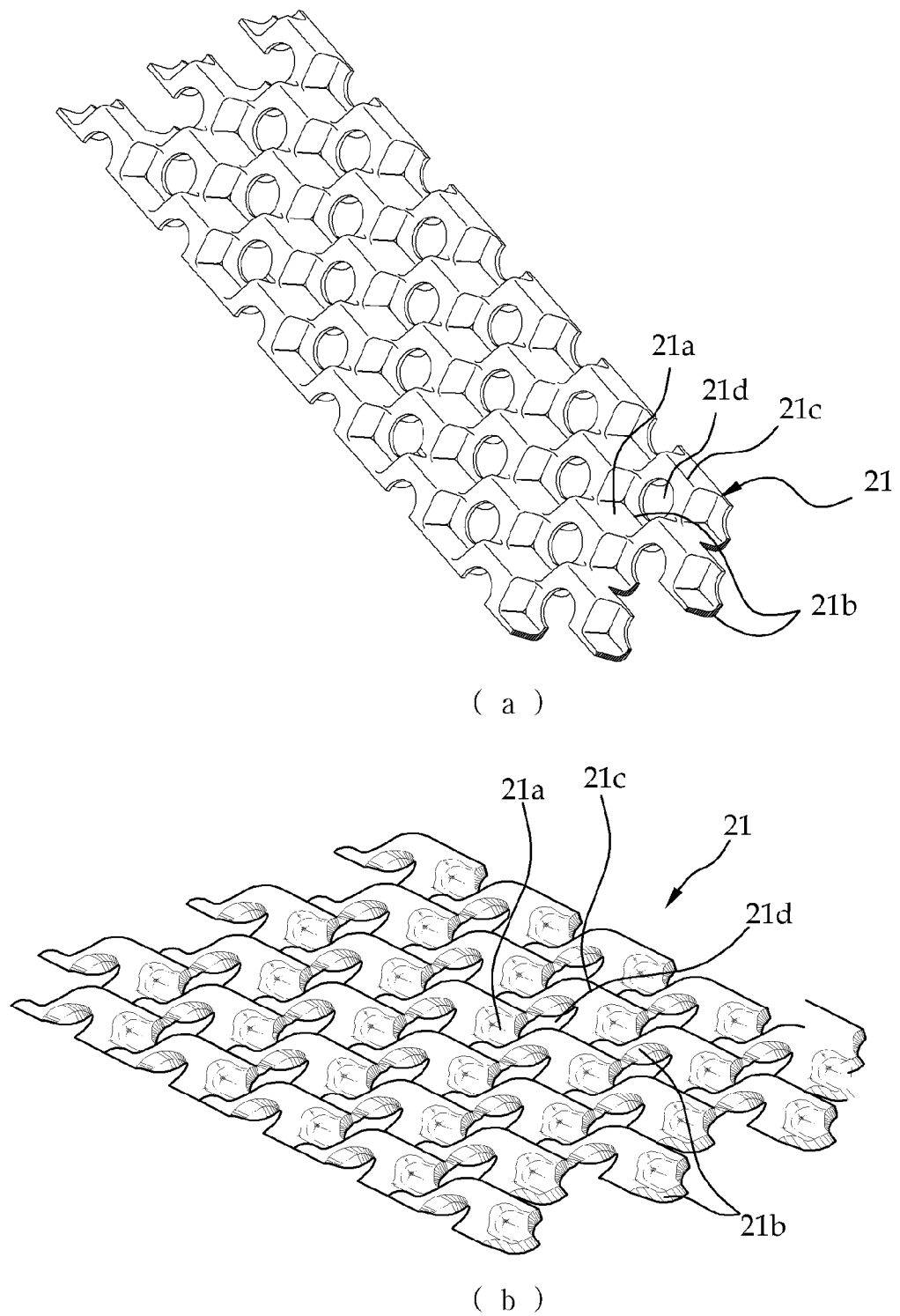
FIG. 5 is a perspective view illustrating various exemplary separators according to an embodiment of the present invention.

FIG. 3 is a plan view of a flow field plate in a separator according to an embodiment of the present invention. FIG. 4 is a perspective view illustrating a flow path of reaction gases by a flow field plate in a separator according to an embodiment of the present invention. FIG. 5 is a perspective view illustrating various exemplary separators according to an embodiment of the present invention.

As shown in FIG. 2, the GDL 12 may be bonded to both surfaces of the MEA 11, and the separator 20 may be bonded to both outer surfaces of the GDL 12.

The separator 20 may be divided into an anode-side separator and a cathode-side separator. The anode-side separator may be bonded to the outer surface of the GDL 12 bonded to the anode of the MEA 11 to supply fuel gases such as hydrogen. The cathode-side separator may be bonded to the outer surface of the GDL 12 bonded to the cathode of the MEA 11 to supply oxidant gases such as oxygen or air.

The separator 20 may include a flow field plate 21 having a porous plate structure forming a flow field, and a main body plate 22 bonded to the outer side of the flow field plate 21. The flow field of the flow field plate 21 may serve as a supply passage for delivering reaction gases (fuel and oxidant gas) to the GDL 12 and exhausting water that is a by-product generated by an electrochemical reaction through the GDL 12.

Here, the flow field plate 21 may be bonded to the outer surface of the GDL 12, and the main body plate 22 may be bonded to the outer side of the flow field plate 21. Thus, a space between the main body plate 22 and the GDL 12 may become a flow space in which reaction gases flow while contacting the surface of the GDL 12.

The flow field plate 21 may be manufactured by performing an aperture-process and a foaming-process (embossing process for forming an embossing pattern) on a metal plate such as stainless steel plate. The flow field plate 21 may have a structure in which embossing patterns of aperture 21d and unevenness are repeatedly formed.

More specifically, as shown in FIGS. 2 through 5, the embossing patterns of an unevenness structure may be repeatedly formed at predetermined intervals over the whole area of the flow field plate 21, and apertures 21d disposed at predetermined intervals in front to rear and right to left directions may be repeatedly formed at one side of the embossing pattern.

In this case, the embossing patterns may be formed to be repeatedly arranged in front to rear and right to left directions. The respective embossing patterns may include a protrusion 21a that protrudes in a shape of mountain at a place where the embossing patterns are repeatedly arranged at predetermined intervals when viewed from each surface of the flow field plate 21.

The protrusion 21a may be repeatedly arranged in front to rear and right and left directions, wherein one sharp tip of the protrusion that protrudes from one surface of the flow field plate 21 may become a land portion 21b that is bonded to the GDL 12, and the other sharp tip of the protrusion that protrudes from the other surface of the flow field plate 21 may become a bonding portion 21c that is bonded to the main body plate 22.

The land portion 21b and the bonding portion 21c may be arranged at predetermined intervals in front to rear and right to left directions. Particularly, the bonding structure of the land portion 21b and the GDL 12 may become a linear contact structure in which lines are spaced from each other at predetermined intervals.

In a typical separator shown in FIG. 1, the land portion may be bonded to GDL with a continuous planar contact structure having a large area and a certain width between channel portions, but in the separator according to the embodiment of the present invention, the land portions 21b spaced from each other may be bonded to the GDL 12 with a dotted line pattern as a whole.

Also, the aperture 21d may be formed in an inclined surface of the protrusion 21a to form a repetitive pattern with a certain interval. The aperture 21d may serve as a passage aperture through which reaction gases and water pass. The aperture 21d may be formed to have various shapes such as circle or oval.

Other portions of the flow field plate except the land portion 21b of the protrusion 21a may be spaced from the GDL 12. A gap may be formed between the side end of the protrusion 21a and the GDL 12 to allow reaction gases to flow in a lateral direction. Reaction gases may flow through the spaced gap of the side end of the protrusion 21a as well as the aperture 21d, and thus may flow in a three-dimensional path of vertical and horizontal directions.

As a result, the flow field formed by the aperture 21d and the gap of the side end of the protrusion 21a may allow reaction gases forced flow conversion. When reaction gases supplied to the separator 20 passes through the flow field plate 21, the reaction gases may pass through the aperture 21a and the gap of the side end of the protrusion 21a to flow in vertical and horizontal directions and show a phase of a turbulent flow.

Particularly, as reaction gases move in a form of turbulent flow, forced convection may occur from the flow field to the GDL in addition to the mass transfer caused by diffusion between the flow field and the GDL. Accordingly, mass transfer may be performed by forced flow conversion.

Thus since the flow phenomenon in GDL direction, i.e., convection in GDL direction allows reaction gases to forcibly and artificially flow into GDL, the amount of reaction gases delivered from the reaction flow field of the separator to the GDL may be increased, and the reaction gases at the catalyst layer of MEA may be maintained at a higher concentration.

In a typical separator shown in FIG. 1, reaction gases flow in a form of a laminar flow (where only velocity vector with respect to flow direction exists) along a flow field space in the channel portion that is longitudinally formed in one direction, and gas transfer (gas transfer from separator to GDL) is mainly performed only by diffusion. In the separator according to the embodiment of the present invention, however, since mass transfer may be additionally performed by forced convection, the delivery amount of reaction gases may be increased, and the flow velocity in GDL direction may occur due to a turbulent flow in the flow field, thereby increasing the effect of the mass transfer.

Furthermore, in a typical separator, since the land portion is bonded to GDL with a continuous planar contact structure having a large area, differences of gas transfer and diffusion between the land portion and the channel portion significantly occur. However, in the separator according to the embodiment of the present invention, since the land portion 21b is bonded to the GDL 12 with a dotted line contact structure, differences of gas diffusion and concentration between areas in the GDL 12 that are bonded to the land portion and the flow field portion of the flow field plate may be minimized (uniform concentration distribution is enabled), and uniform gas diffusion and electrochemical reaction, and electricity generation can be achieved over the whole reaction area.

Thus, the performance of a fuel cell can be improved, and the limiting current density of the fuel cell can be increase, thereby enabling operation at a high power section compared to a related art.

Also, since the contact area of the land portion 21b that is a bonding portion with the GDL 12 is significantly reduced, water can be more easily exhausted from the GDL 12, and the performance of a fuel cell can be prevented from being reduced due to flooding at a high current range.

Here, a process for fabricating the flow field plate 21 may include forming a plurality of apertures 21d of a repetitive pattern by performing an etching process and a piercing process on a flat metal plate.

The metal plate may include a stainless steel plate that is a material for a typical metallic separator.

Next, the protrusion 21a having a repetitive pattern may be formed to form the land portion 21b and the bonding portion 21c. The protrusion 21a may be formed in an embossing pattern, and the shape of the flow field plate 21 may be completed by performing an embossing process using a press die.

The flow field plate 21 may be bonded to the GDL 12 of a cell, and the GDL 12 may be bonded to the land portion 21b that protrudes from one surface of the flow field plate 21 in a repetitive pattern.

On the other hand, the main body plate 22 may serve to cover the reaction gas flow space formed by the flow field plate 21 from the outside of the cell. The main body plate 22 may be bonded to the surface of the flow field plate 21 opposite to the surface of the flow field plate 21 to which the GDL 12 is bonded.

The main body plate 22 may be bonded to the bonding portion 21c that protrudes from the other surface of the flow field plate 21 in a repetitive pattern, and although not shown in the drawing, may have a structure in which an inlet and an outlet for reaction gases are longitudinally formed at one side and the other side thereof.

The inlet and the outlet of the main body plate 22 are portions that form an internal manifold of a stack in which unit cells are stacked. Reaction gases supplied through the inlet may pass through the flow field plate 21 inside the main body plate 22, and unreacted gases and by-products having passed the flow field plate 21 may be exhausted through the outlet.

Also, the flow space in which the flow field plate 21 is disposed between the main body plate 22 and the GDL 12 has to be sealed, a gasket or a sealing member may be disposed along the edge of the main body plate 22, i.e., the perimeter of the flow field plate between the main body plates of adjacent cells.

Thus, when the separator according to the embodiment of the present invention, reaction gases flow in a form of a turbulent flow at the flow field that is formed by the flow field plate of a porous plate structure, thereby increase diffusion into GDL and facilitating uniform electricity generation through uniform gas diffusion and concentration. Thus, increase of the current density and improvement of performance of a fuel cell can be achieved.

Accordingly, when a separator for a fuel cell according to an embodiment of the present invention is applied in a flow field formed by a flow field plate having a porous plate structure, reaction gases flow in a form of a turbulent flow, thereby increasing diffusion to GDL while facilitating uniform electricity generation through uniform gas diffusion and concentration. Thus, increase of a current density and improvement of performance of a fuel cell can be achieved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A separator for a fuel cell, comprising:
a flow field plate having a porous plate structure and bonded to an outer surface of a gas diffusion layer to form a reaction gas flow field; and
a main body plate bonded to an outer surface of the flow field plate to seal the reaction gas flow field,
wherein the flow field plate has protrusions that protrude from both surfaces of the flow field plate in a repetitive pattern while forming an uneven structure, and the flow field plate has a land portion bonded to the gas diffusion layer at a sharp tip of a protrusion thereof protruding from one surface of the flow field plate and a bonding portion bonded to the main body plate at an opposite sharp tip of a protrusion thereof protruding from the other surface of the flow field plate,
wherein the flow field plate is made of a single metal plate having a plurality of apertures, and the protrusions are depressions pressed into the metal plate and formed in a repetitive embossing pattern, and
wherein each aperture in said plurality of apertures is located on a flat face on the protrusion's surface, and said each aperture is shaped as a circular opening, and
wherein the outer perimeter of said flat face has a hexagonal shape.

2. The separator of claim 1, wherein a plurality of land portions of the protrusion are spaced from each other on a surface of the flow field plate in front-to-rear and right-to-left directions.

3. The separator of claim 1, wherein the protrusion has an aperture in an inclined side surface thereof being configured to allow reaction gases to pass therethrough.

4. The separator of claim 3, wherein a plurality of apertures are arranged at predetermined intervals on the flow field plate in front-to-rear and right-to-left directions.

5. The separator of claim 3, wherein the land portions of the protrusions are bonded to the gas diffusion layer with a linear contact condition.

6. The separator of claim 1, wherein other portions of the protrusion that protrude from the one surface of the flow field plate except the land portion are spaced from the gas diffusion layer.

7. The separator of claim 6, wherein a side end of the protrusion is spaced from the gas diffusion layer such that reaction gases pass through a gap between the side end of the protrusion and the gas diffusion layer in a lateral direction.

8. A flow field plate for a fuel cell separator, comprising:
a porous plate structure having an inner surface and an outer surface; and
protrusions that protrude from both surfaces of the flow field plate in a repetitive pattern while forming an uneven structure;

wherein a land portion of the inner surface is configured to be bonded, at a sharp tip of a protrusion of the inner surface, to an outer surface of a gas diffusion layer to form a reaction gas flow field; and wherein the outer surface of the porous plate structure is configured to be bonded, at an opposite sharp tip of a protrusion of the outer surface, to a main body plate to seal the reaction gas flow field, wherein the flow field plate is made of a single metal plate having a plurality of apertures, and the protrusions are depressions pressed into the metal plate and formed in a repetitive embossing pattern, and wherein each aperture in said plurality of apertures is located on a flat face on the protrusion's surface, and said each aperture is shaped as a circular opening, and wherein the outer perimeter of said flat face has a hexagonal shape.

9. The flow field plate of claim 8, wherein a plurality of land portions of the protrusion are spaced from each other on a surface of the flow field plate in front-to-rear and right-to-left directions.

10. The flow field plate of claim 9, wherein the protrusion has an aperture in an inclined side surface thereof being configured to allow reaction gases to pass therethrough.

11. The flow field plate of claim 10, wherein a plurality of apertures are arranged at predetermined intervals on the flow field plate in front-to-rear and right-to-left directions.

12. The flow field plate of claim 10, wherein the land portions of the protrusions are configured to be bonded to the gas diffusion layer with a linear contact condition.

13. A fuel cell, comprising:
a membrane electrode assembly (MEA);
a gas diffusion layer adjacent to the MEA;
a flow field plate having a porous plate structure and bonded to an outer surface of the gas diffusion layer to form a reaction gas flow field; and
a main body plate bonded to an outer surface of the flow field plate to seal the reaction gas flow field,
wherein the flow field plate has protrusions that protrude from both surfaces of the flow field plate in a repetitive pattern while forming an uneven structure, and the flow field plate has a land portion bonded to the gas diffusion layer at a sharp tip of a protrusion thereof protruding from one surface of the flow field plate and a bonding portion bonded to the main body plate at an opposite sharp tip of a protrusion thereof protruding from the other surface of the flow field plate,
wherein the flow field plate is made of a single metal plate having a plurality of apertures, and the protrusions are depressions pressed into the metal plate and formed in a repetitive embossing pattern, and
wherein each aperture in said plurality of apertures is located on a flat face on the protrusion's surface, and said each aperture is shaped as a circular opening, and
wherein the outer perimeter of said flat face has a hexagonal shape.

* * * * *